(12) United States Patent
Villarreal, Jr.

(10) Patent No.: US 10,558,882 B2
(45) Date of Patent: Feb. 11, 2020

(54) PERFORMING DISTANCE-BASED FEATURE SUPPRESSION

(71) Applicant: Texas Instruments Incorporated, Dallas, TX (US)

(72) Inventor: Jesse Gregory Villarreal, Jr., Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 69 days.

(21) Appl. No.: 15/853,204

(22) Filed: Dec. 22, 2017

(65) Prior Publication Data

US 2018/0197036 A1 Jul. 12, 2018

Related U.S. Application Data

(60) Provisional application No. 62/444,067, filed on Jan. 9, 2017.

(51) Int. Cl.
*G06K 9/00* (2006.01)
*G06K 9/46* (2006.01)
*G06K 9/62* (2006.01)

(52) U.S. Cl.
CPC ............. *G06K 9/46* (2013.01); *G06K 9/6228* (2013.01); *G06K 9/6267* (2013.01)

(58) Field of Classification Search
CPC ...... G06K 9/46; G06K 9/6267; G06K 9/6228; G06K 9/00449; G06K 9/00463
See application file for complete search history.

(56) References Cited

U.S. PATENT DOCUMENTS

| | | | | | |
|---|---|---|---|---|---|
| 4,616,369 A | * | 10/1986 | Rademacher | ........... | E04H 4/143 4/497 |
| 5,761,685 A | * | 6/1998 | Hutson | ................... | G01S 3/802 715/234 |
| 8,260,048 B2 | * | 9/2012 | Jin | ........................... | G06T 7/11 382/128 |
| 8,571,315 B2 | * | 10/2013 | Sabe | .................... | G06K 9/6256 382/103 |
| 9,020,822 B2 | * | 4/2015 | Kalinli-Akbacak | .... | G10L 15/00 704/270 |
| 9,836,671 B2 | * | 12/2017 | Gao | .................... | G06F 16/3347 |
| 2002/0164063 A1 | * | 11/2002 | Heckman | ........... | G01N 15/1475 382/133 |

(Continued)

OTHER PUBLICATIONS

Khronos Group, "The OpenVX Specification", Version 1.1, Mar. 10, 2017, 302 pages.

*Primary Examiner* — Amir Alavi

(74) *Attorney, Agent, or Firm* — Brian D. Graham; Charles A. Brill; Frank D. Cimino

(57) ABSTRACT

Methods, apparatus, systems to perform distance-based feature suppression of features of an image in a feature list of the image are disclosed. A method includes accessing the feature list, comparing a selected feature in the feature list with features located within a first distance of the selected feature, when features located within the first distance are non-suppressed or valid and are stronger than different non-suppressed features, marking the features as valid and marking other non-suppressed features as suppressed. When the features are suppressed or invalid and are not stronger than non-suppressed features, determining if features of the feature list are marked as valid or suppressed.

20 Claims, 7 Drawing Sheets

(56) References Cited

U.S. PATENT DOCUMENTS

| | | | |
|---|---|---|---|
| 2013/0259328 A1* | 10/2013 | Hama | G06K 9/00087 |
| | | | 382/124 |
| 2014/0114655 A1* | 4/2014 | Kalinli-Akbacak | G10L 25/63 |
| | | | 704/231 |
| 2018/0197036 A1* | 7/2018 | Villarreal, Jr. | G06K 9/46 |
| 2019/0005347 A1* | 1/2019 | Kishimoto | G06K 9/46 |

* cited by examiner

PERFORMING DISTANCE-BASED FEATURE SUPPRESSION

CROSS-REFERENCE TO RELATED APPLICATIONS

This application claims the benefit of and priority to U.S. Provisional Application No. 62/444,067, filed Jan. 9, 2017, which is hereby fully incorporated herein by reference.

BACKGROUND

Feature (or corner) detection is a technique that is used in computer vision algorithms to extract useful structural information from images that can be utilized by higher level vision processing algorithms such as object detection or optical flow. Depending on the scene, some corner detectors, such as Harris corners, can produce a relatively large list of corners, many of which may be clustered together spatially. The larger the feature list, the more downstream processing may be required to process the list. Distance-based non-maximum suppression can be used to reduce the size of the list by retaining only the strongest features within a programmable pixel neighborhood.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
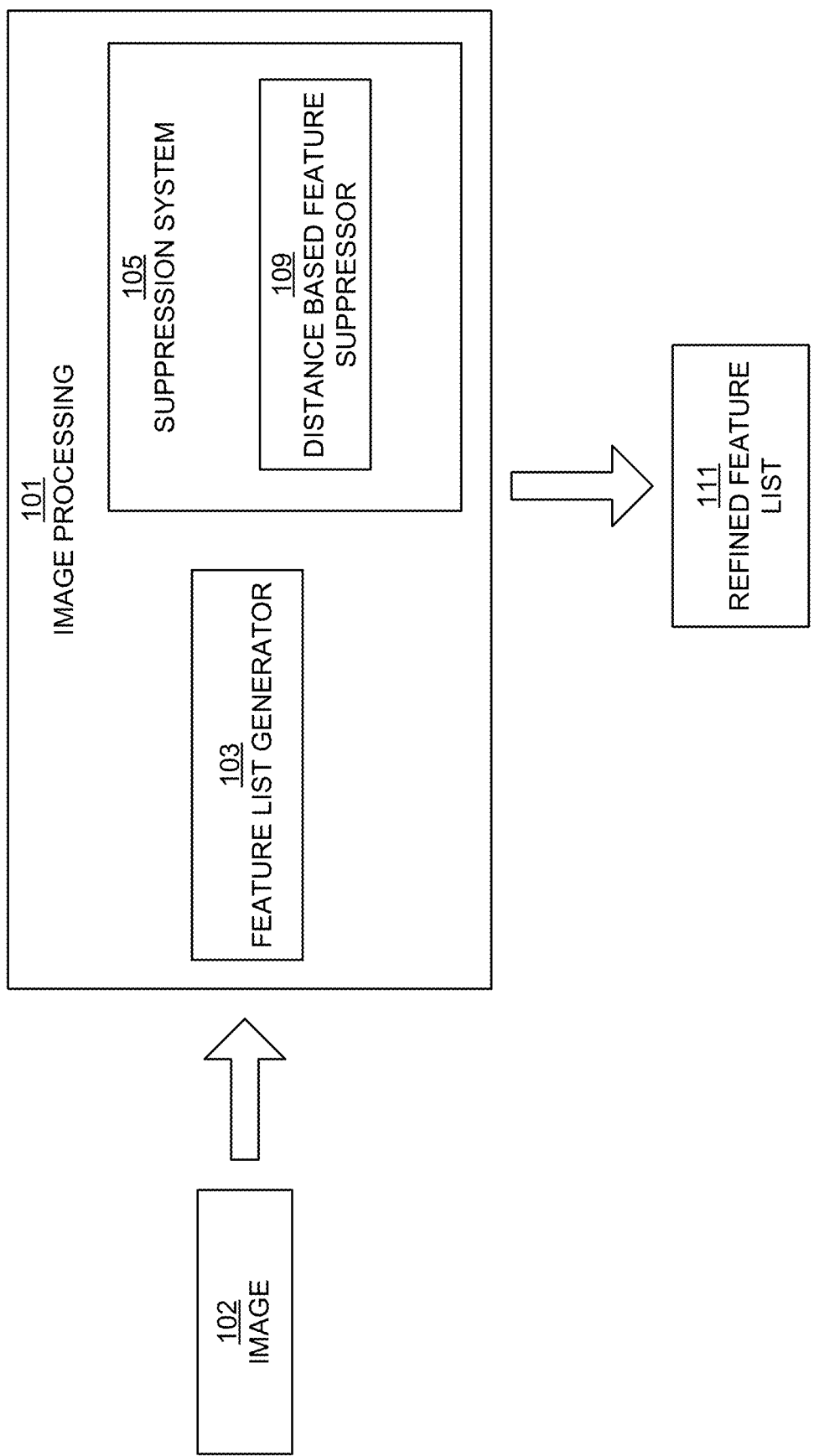
FIG. 1 is an example operating environment of a distance-based feature suppressor.

FIG. 1 is an example operating environment of a distance-based feature suppressor. The example distance-based feature suppressor exhibits high speed performance based on its use of a process that avoids the sorting of large feature lists. FIG. 1 shows an image processing system 101, an image 102, a feature list generator 103, a suppression system 105, a distance-based feature suppressor 109 and a refined feature list 111.

The image processing system 101 performs image processing on acquired digital images (e.g., image 102). Image processing system 101 can include but is not limited to image processing systems that perform tasks such as acquiring, processing, analyzing and understanding digital images. In some examples, image processing system 101 extracts data from the images in order to produce information, e.g., for decision making purposes.

The image 102 is a representation of a real-world object that is acquired by image processing system 101 (such as from imagers, image storage sources, providers of images, cameras, scanners, etc.). After the image 102 is accessed by the image processing system 101, the feature list generator 103 generates a list of features therefrom that are provided to a feature suppression system 105 (features are specific parts of the image). In some examples, a feature detector of the feature list generator 103 determines whether examined image points include an image feature of a given type. In some examples, as described herein, the image features are compared with neighboring features that lie within a certain distance of the image feature that is determined in any suitable manner (algorithm, manual input, etc.).

The suppression system 105 suppresses features that are deemed unnecessary or undesired for achieving the purposes of the application. In some examples, the suppression system can use techniques such as feature list refining and/or non-maximum suppression to remove unwanted parts of an image. In some examples, unwanted parts of the image are parts of the image that are desired removed. In other examples other processes can be used. The suppression system includes distance-based feature suppressor 109.

The distance-based feature suppressor 109 performs feature list refining and/or non-maximum suppression operations on the feature list. The distance-based feature suppressor 109 examines features in a feature list as a part of feature list refining and/or non-maximum suppression operations. In some examples, the feature list can be ordered/obtained by a raster scan of the image. In examples, the feature list is not sorted according to feature strength. As such, the distance-based feature suppressor 109 does not sort the feature list according to feature strength as part of feature list refining or non-maximum suppression. The processing that would be involved in executing sorting operations based on feature strength on the feature list is computationally expensive. Instead of executing such sorting operations, distance-based feature suppressor 109 iterates through the feature list multiple times, comparing features with local "neighbors" which are features that are located within a certain distance. As such, in some examples, computationally expensive sorting operations are avoided. In some examples, if a feature is not found to be either "SUPPRESSED" or "VALID" and is stronger than its non-suppressed neighbors the feature is marked as "VALID." Moreover, in some examples, non-suppressed neighboring features are marked as "SUPPRESSED." Otherwise, nothing is done (in that iteration) and the next feature is examined. In some examples, the loop ends when all features are marked as either "VALID" or "SUPPRESSED."

In operation, images 102 that are received by image processing system 101 are processed by feature list generator 103 which generates feature lists therefrom. Based on the feature lists, the distance-based feature suppressor 109 of suppression system 105 generates the refined feature list 111. The refined feature list 111 generated by distance-based feature suppressor 109 provides a subset of the original features found.

Examples avoid poor speed performance exhibited by approaches that involve sorting of large feature lists (in distance-based non-maximum or non-minimum suppression algorithms). Sorting long lists of features utilizing a DSP can be computationally expensive, even when using optimized algorithms. In some prior approaches sorting operations are a preprocessing step to the actual suppression algorithm. These approaches involve an excessive number of cycles for larger image sizes and feature lists.

Some examples described herein are 77 to 1736 or more times faster on some digital signal processors than sorting using an optimized digital signal processor sort of the feature list. For example, an image frame with pixel resolution of 640 by 480 with 34 k input features can processed at 19 MHz versus some examples described herein that can be processed at 89.2 GHz (468× faster) (1 frame). In other examples, other speeds can be provided.

Examples save power due to far less memory writes than the previously required sorting. Examples take advantage of read cache locality because searches are conducted within a local neighborhood. Some examples use a raster scan rather than random access associated with sorting algorithms.

In some examples, if used in conjunction with a processor with soft-break compiler support for optimal exiting of software pipeline loop, additional speed performance improvement can be realized.

Figure 2:
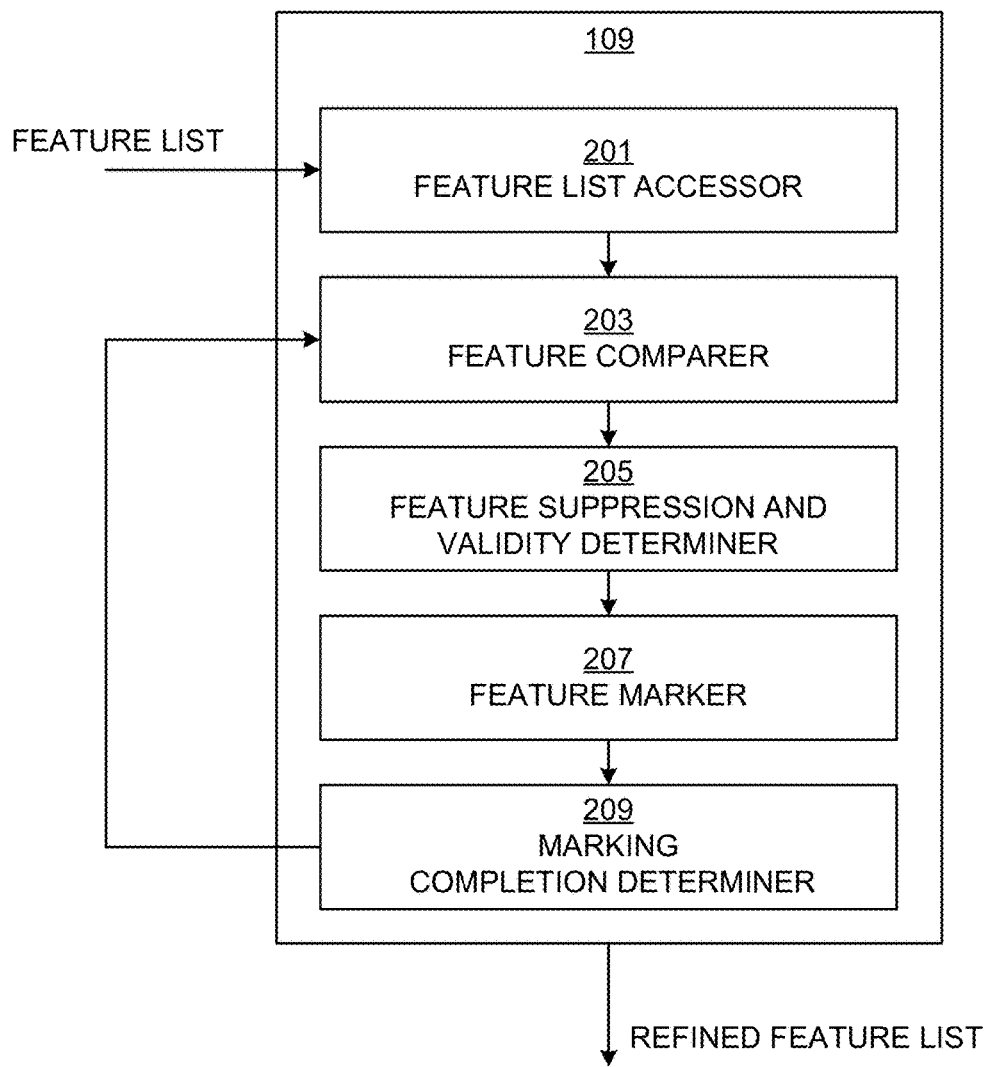
FIG. 2 shows example components of an example distance-based feature suppressor.

FIG. 2 shows components of an example distance-based feature suppressor 109 that operates on an unsorted feature list. FIG. 2 shows an unsorted feature list accessor 201, a feature comparer 203, a feature suppression and validity determiner 205, a feature marker 207, and a marking completion determiner 209.

Referring to FIG. 2, the feature list accessor 201 accesses raster scan ordered feature lists (or feature list ordered in some other suitable manner). In some examples, the feature list accessor 201 accesses feature lists that have not been sorted according to feature strength from a feature list generator (e.g., 103 in FIG. 1). The feature list is used by the distance-based feature suppressor 109 to identify a list of features upon which the removal and/or suppression of unwanted image information is based.

The feature comparer 203 compares a feature in the feature list with neighboring features located within a first distance of the feature. In some examples, the feature comparer 203 searches backward through the feature list until it has searched beyond a minimum distance vertically, or until it has reached the first indexed feature. In some examples, where the features are ordered in column-major order, feature comparer 203 searches backward through the feature list until it has searched a minimum distance horizontally, or has reached the first indexed feature. In addition, in some examples, the feature comparer 203 searches forward through the feature list until it has searched beyond a minimum distance vertically, or has reached the end of the list. Where the features are ordered in column-major order, feature comparer 203 searches forward through the feature list until it has searched beyond a minimum distance horizontally, or has reached the end of the feature list. In some examples, because the feature list is ordered in raster scan or some other suitable manner of ordering the features, the entire feature list does not have to be traversed for each feature comparison.

The feature suppression and validity determiner 205 determines when a neighboring feature has not been characterized as suppressed or valid and is stronger than non-suppressed neighboring features. In some examples, when the feature suppression and validity determiner 205, determines that a neighboring feature is not either suppressed or valid and is stronger than non-suppressed neighboring features, the feature marker 207 marks the neighboring feature as valid and marks other non-suppressed neighboring features as suppressed. In addition, in some examples, when the feature suppression and validity determiner 205, determines that a neighboring feature is suppressed or invalid and is not stronger than non-suppressed neighboring features the next feature of the feature list is examined to determine whether it is marked as valid or suppressed.

The marking completion determiner 209 determines if all features are marked as either valid or suppressed. In some examples, the marking completion determiner 209 determines if all features are marked as valid or suppressed by examining the features list to determine if all features have been marked. In some examples, when the marking completion determiner 209 determines that all features have been marked, the searching is ended.

While an example manner of implementing the distance-based feature suppressor 109 of FIG. 1 is illustrated in FIG. 2, one or more of the elements, processes and/or devices illustrated in FIG. 2 may be combined, divided, re-arranged, omitted, eliminated and/or implemented in any other way. For example, the unsorted feature list accessor 201, the feature comparer 203, the feature suppression validity determiner 205, the feature marker 207, the marking completion determiner 209 and/or, more generally, the example the distance-based feature suppressor 109 of FIG. 2 may be implemented by hardware, software, firmware and/or any combination of hardware, software and/or firmware. Thus, for example, any of the example the feature list accessor 201, the feature comparer 203, the feature suppression and validity determiner 205, the feature marker 207, the marking completion determiner 209 and/or, more generally, the example distance-based feature suppressor 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the feature list accessor 201, the feature comparer 203, the feature suppression and validity determiner 205, the feature marker 207, the marking completion determiner 209 is/are hereby expressly defined to include a tangible computer readable storage device or storage disk such as a memory, a digital versatile disk (DVD), a compact disk (CD), a Blu-ray disk, etc. storing the software and/or firmware. Further still, the example the distance-based feature suppressor 109 of FIG. 1 may include one or more elements, processes and/or devices in addition to, or instead of, those illustrated in FIG. 2, and/or may include more than one of any or all of the illustrated elements, processes and devices.

Figure 3:
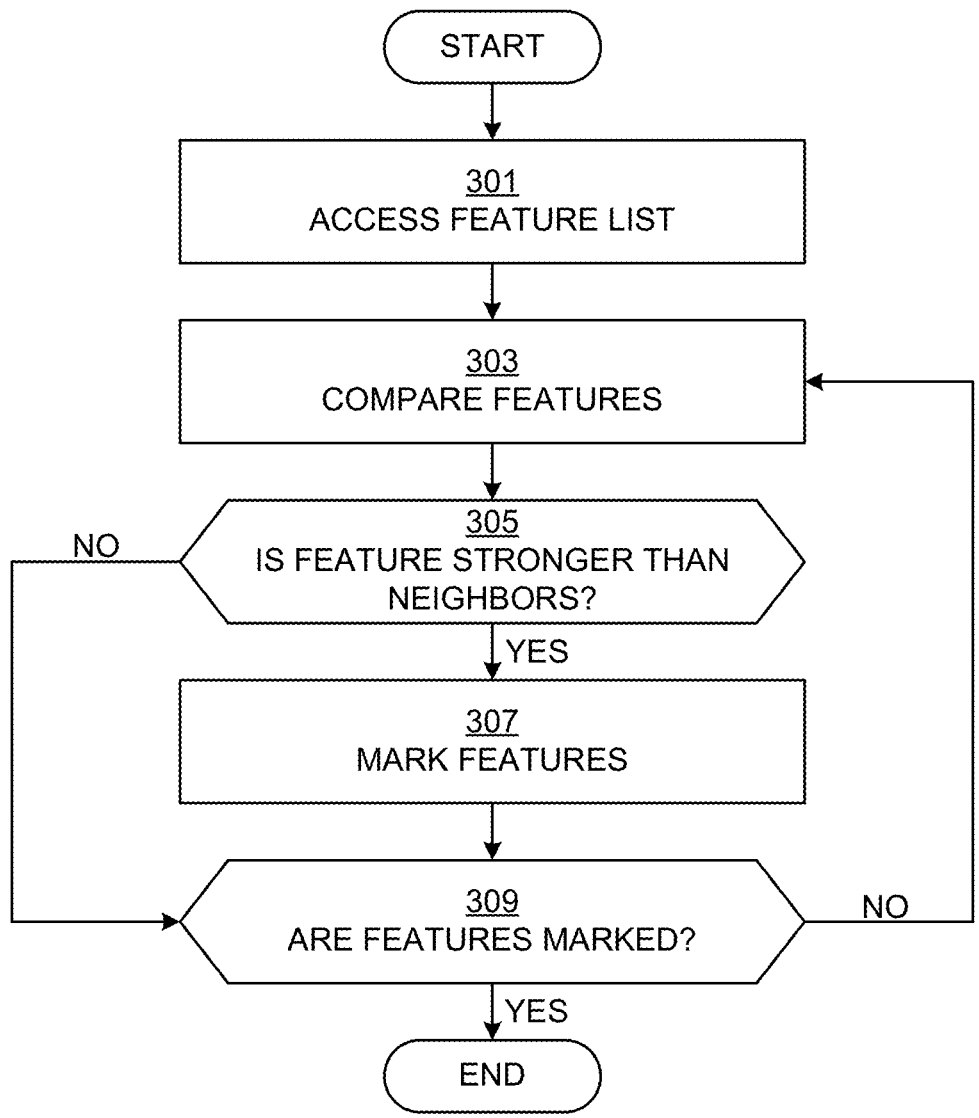
FIG. 3 shows a flowchart of a method for distance-based feature suppression of features in a raster-scan ordered feature list that is representative of machine readable instructions for execution by a processor.

A flowchart representative of example machine readable instructions for implementing the distance-based feature suppressor 109 of FIG. 1 is shown in FIG. 3. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although an example programs are described with reference to the flowcharts illustrated in FIGS. 3-6, many other methods of implementing the example apparatus distance-based feature suppressor 109 may alternatively be used. For example, the order of execution of the blocks may be changed, and/or some of the blocks described may be changed, eliminated, or combined.

As mentioned above, the example processes of FIGS. 3-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 shows a flowchart of a method for distance-based feature suppression of features in an unsorted feature list.

Referring to FIG. 3, the feature list accessor 201 accesses raster-scan ordered feature lists (or feature list ordered in some other suitable manner). In some examples, the feature list accessor 201 accesses ordered feature lists from the feature list generator 103 (block 301). In some examples, a raster scan orders the features in row-major order. In other examples, the feature list can be provided by sources that order the features in column-major order. The feature list is used by the distance-based feature suppressor 109 to identify a list of features upon which the removal and/or suppression of unwanted image information is based.

The feature comparer 203 compares a feature in the feature list with neighboring features located within a first distance of the feature (block 303). In some examples, the feature comparer 203 searches backward through the feature list until it has searched beyond a minimum distance vertically, or until it has reached the first indexed feature. In some examples, where the features are ordered in column-major order, feature comparer 203 searches backward through the feature list until it has searched a minimum distance horizontally, or has reached the first indexed feature. In addition, in some examples, the feature comparer 203 searches forward through the feature list until it has searched beyond a minimum distance vertically, or has reached the end of the feature list. In some examples, where the features are ordered in column-major order, feature comparer 203 searches forward through the feature list until it has searched beyond a minimum distance horizontally, or has reached the end of the feature list. In some examples, because the feature list is ordered either in raster scan or other suitable manners, the entire feature list does not have to be traversed for each feature comparison.

The feature suppression and validity determiner 205 determines when a neighboring feature is not suppressed or valid and is stronger than all non-suppressed neighboring features (block 305). In some examples, when the feature suppression and validity determiner 205, determines that a neighboring feature is not suppressed or valid and is stronger than all non-suppressed neighboring features, the feature marker 207 marks the neighboring feature as valid and marks other non-suppressed neighboring features as suppressed (block 307). In addition, in some examples, when feature suppression and the validity determiner 205, determines that a neighboring feature is suppressed or invalid and is not stronger than all non-suppressed neighboring features, it is determined if all features have been marked (block 309), and if all of the features from the feature list has not been marked, the next feature of the feature list is examined to determine whether it is marked as valid or suppressed.

The marking completion determiner 209 determines if all features are marked as valid or suppressed. In some examples, the marking completion determiner 209 determines if all features are marled as valid or suppressed by examining the features list to determine if all features have been marked. In some examples, when the marking completion determiner 209 determines that all features have been marked, the searching is ended.

Figure 4:
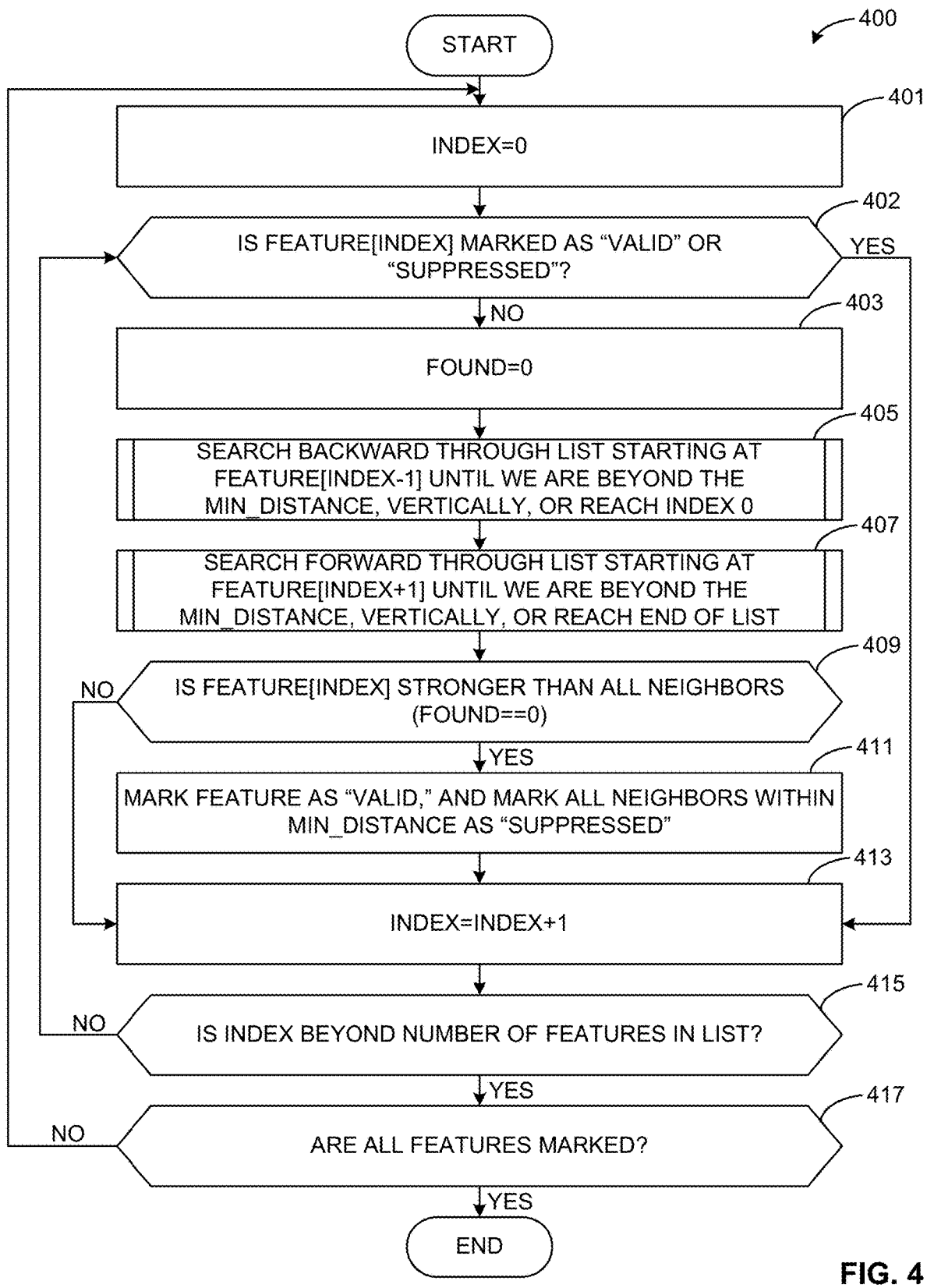
FIG. 4 is a flowchart of an example implementation of the process of FIG. 3 that is representative of machine readable instructions for execution by a processor.

FIG. 4 is a flowchart of an example implementation of the process of FIG. 3. Referring to FIG. 4, the feature list accessor 201 accesses the feature list and identifies the feature in the feature list that has been designated/associated with index 0 (block 401). The feature comparer 203 determines if the feature associated with index 0 has been marked as valid or suppressed (block 402). If it is determined that the feature has not been marked as valid or suppressed (block 403), the feature comparer 203 searches backward through the feature list starting at the feature associated with index−1 and continues searching beyond the minimum distance vertically, or until index 0 is reached (block 405). In some examples, where the features are ordered in column-major order, feature comparer 203 searches backward through the feature list until it has searched a minimum distance horizontally, or until index 0 is reached.

In addition, the feature comparer 203 searches forward through the feature list starting at the feature associated with index+1 and continues searching beyond the minimum distance vertically, or until the end of the list is reached (block 407). In some examples, where the features are ordered in column-major order, feature comparer 203 searches forward through the feature list until it has searched beyond a minimum distance horizontally, or until the end of the list is reached.

The feature comparer 203 determines if the feature being examined is stronger than all of its neighbors (block 409). If the feature comparer 203 determines that a feature is stronger than all of its neighbors, then the feature marker 207 marks the feature as valid, and marks all neighbors within a minimum distance of the feature as suppressed (block 411). If the feature comparer 203 determines that a feature being examined is not stronger than all of its neighbors, then the index is incremented (block 413).

The feature comparer 203 determines if the value of the current index is greater than or equal to the number of features in the features list (block 415). If the value of the current index is not greater than or equal to the number of features in the features list, control returns to block 402. If the value of the current index is greater than or equal to the number of features in the features list, control proceeds to block 417 where the feature marker 207 determines if all features have been marked. If the feature marker 207 determines that all of the features have been marked (block 417), control proceeds to end where the process is ended.

Figure 5:
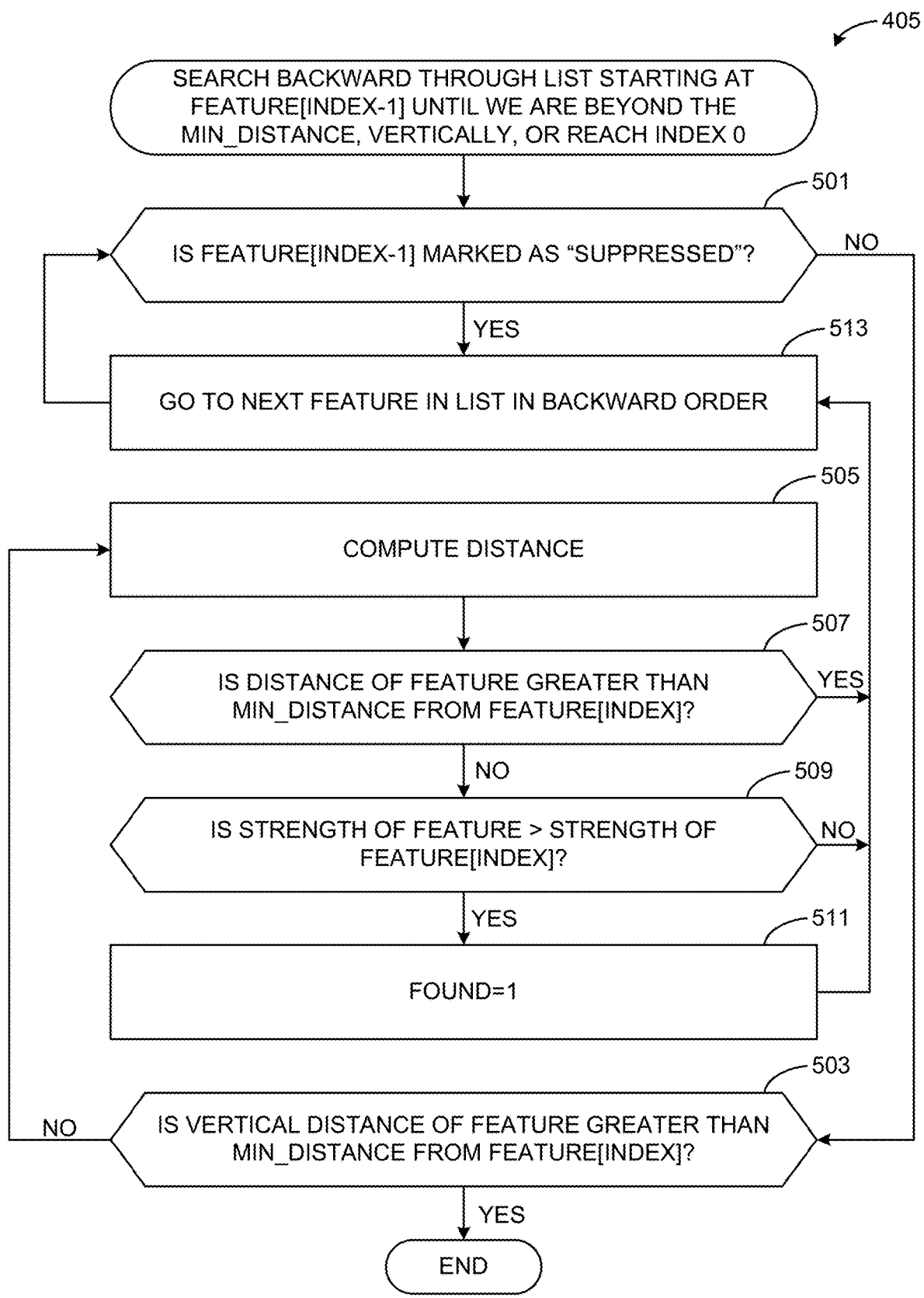
FIG. 5 is a flowchart showing additional detail of an example implementation of block 405 of FIG. 4 that is representative of machine readable instructions for execution by a processor.

FIG. 5 flowchart of block 405 of FIG. 4. Referring to FIG. 5, the feature comparer 403 determines if feature index−1 is marked as suppressed (block 501). If feature index−1 is marked as suppressed, then the feature comparer 403 goes to the next feature in the list in backward order. If feature index−1 is not marked as suppressed, then feature suppression and validity determiner 205 determines if the vertical distance (or horizontal distance if features are ordered in column-major order) of the feature [index−1] is greater than the minimum distance from the feature [index] (block 503). If the vertical (or horizontal distance if features are ordered in column-major order) distance of the feature [index−1] is greater than the minimum distance from the feature [index], control proceeds to end. If the vertical distance (or horizontal distance if features are ordered in column-major order) of the feature [index−1] is not greater than the minimum distance from the feature [index], the distance is computed (block 505). Feature comparer 403 determines if the distance of the feature [index−1] is greater than the minimum distance from the feature [index] (block 507). If it is determined that the distance of the feature [index−1] is greater than the minimum distance from the feature [index], feature comparer goes to the next feature in the feature list in backward order. If it is determined that the distance of the feature [index−1] is not greater than the minimum distance from the feature [index], the feature comparer 403 determines if the strength of the feature [index−1] is greater than the strength of the feature [index] (block 509). If it is determined that the strength of the feature [index−1] is greater than the strength of the feature [index], the next feature in the list is examined in backward order (block 513).

Figure 6:
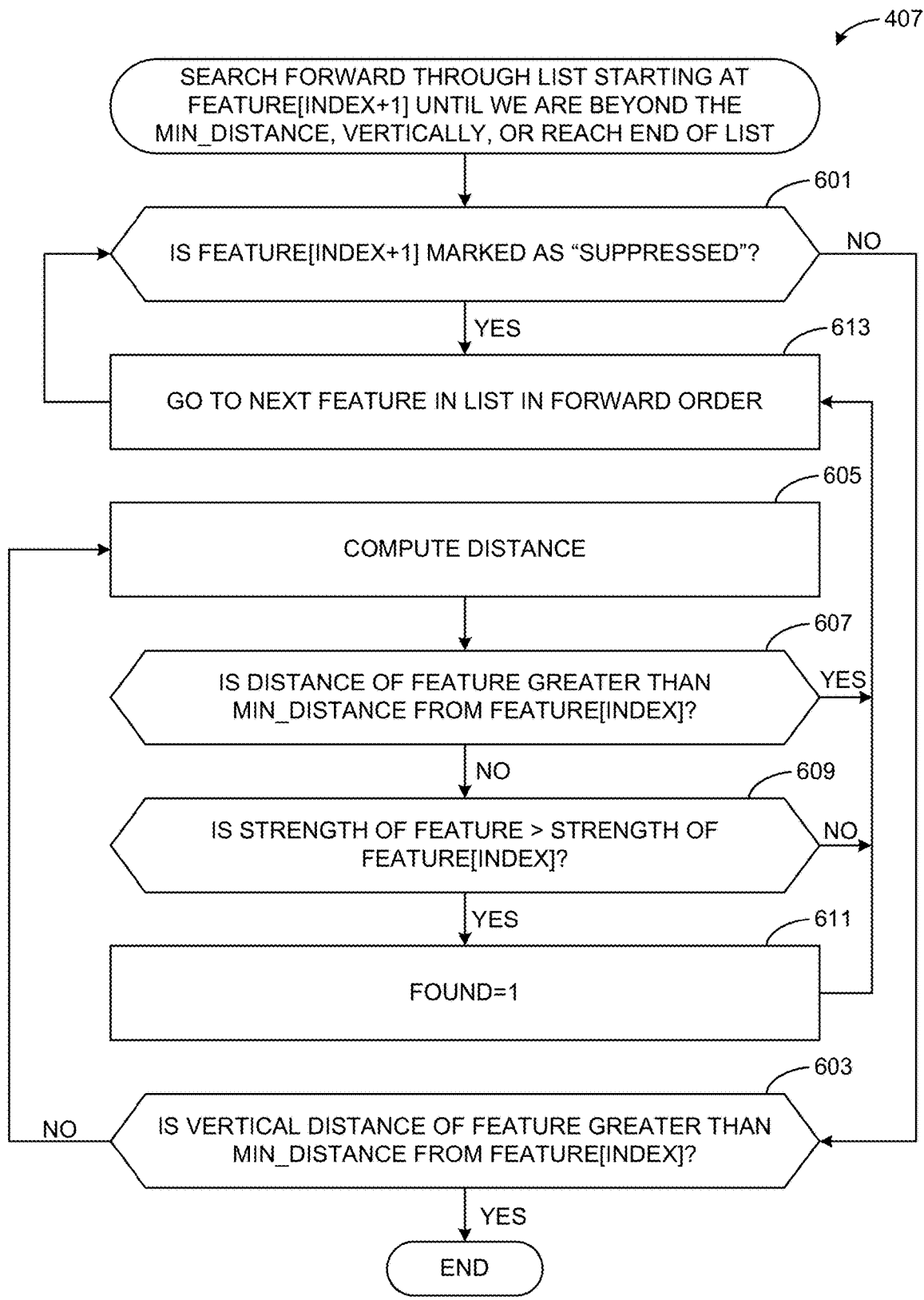
FIG. 6 flowchart of block 407 of FIG. 4 that is representative of machine readable instructions for execution by a processor.

FIG. 6 flowchart of block 407 of FIG. 4. Referring to FIG. 6, feature comparer 403 determines if feature [index+1] is marked as suppressed (block 601). If feature [index+1] is marked as suppressed, then feature comparer 403 goes to the next feature in the list in backward order. If feature index+1 is not marked as suppressed, then feature suppression and validity determiner 205 determines if the vertical distance (or horizontal distance if features are ordered in column-major order) of the feature index+1 is greater than the minimum distance from the feature [index] (block 603). If the vertical distance (or horizontal distance if features are ordered in column-major order) of the feature [index+1] is greater than the minimum distance from the feature [index], control proceeds to end. If the vertical distance (or horizontal distance if features are ordered in column-major order) of the feature [index+1] is not greater than the minimum distance from the feature [index], the distance is computed. Feature comparer 403 determines if the distance of the feature [index+1] is greater than the minimum distance from the feature [index] (block 605). If it is determined that the distance of the feature [index+1] is greater than the minimum distance from the feature [index] (block 607), feature comparer 403 goes to the next feature in the feature list in forward order (block 613). If it is determined that the distance of the feature index+1 is not greater than the minimum distance from the feature [index], the feature comparer 403 determines if the strength of the feature [index+1] is greater than the strength of the feature [index] (block 609). If it is determined that the strength of the feature [index+1] is greater than the strength of the feature [index], the next feature in the list is examined in forward order (block 613).

Figure 7:
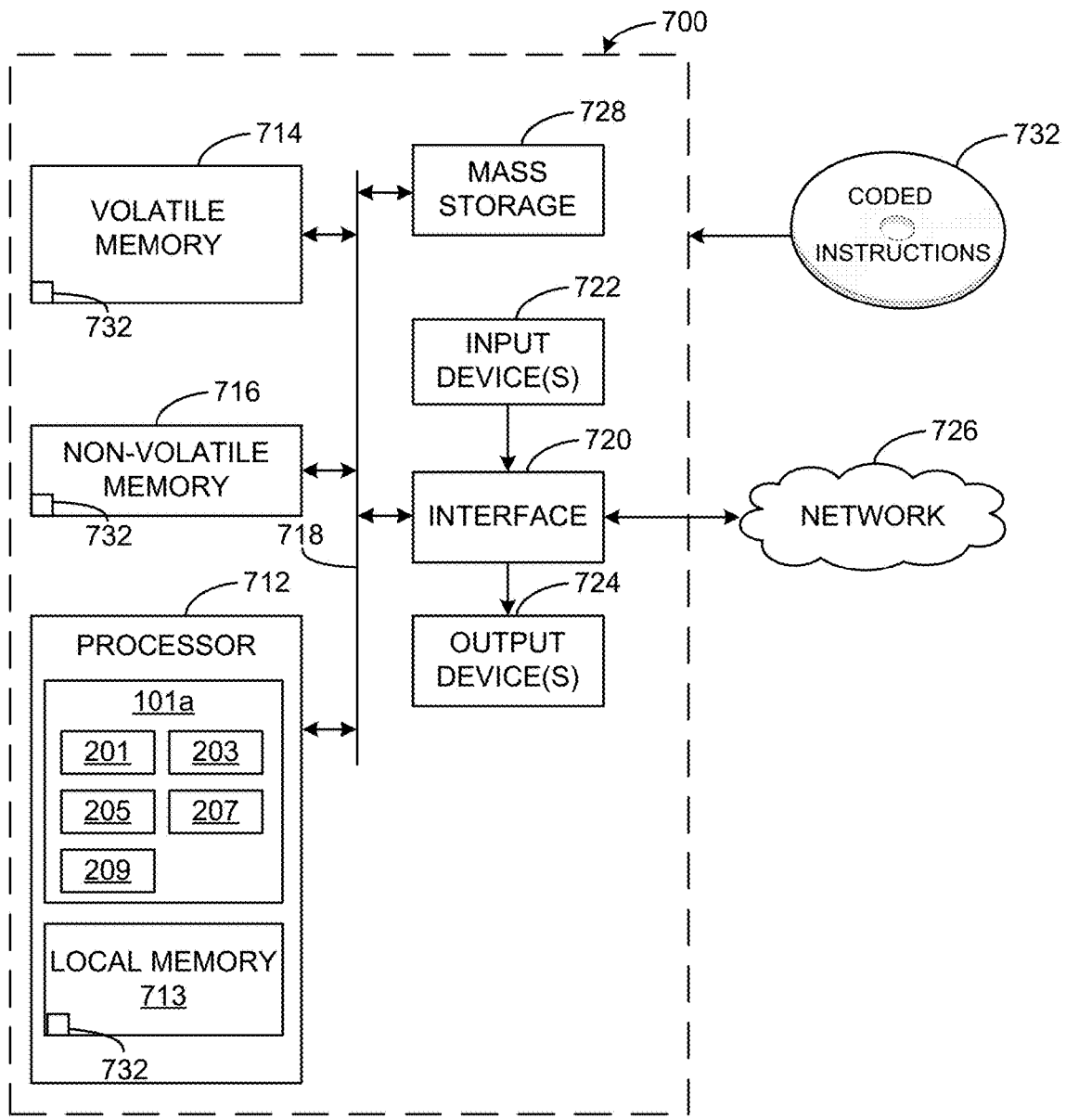
FIG. 7 is a block diagram of an example processor platform capable of executing the instructions of FIGS. 3-6.

FIG. 7 is a block diagram of an example processor platform 700 capable of executing the instructions of FIGS. 3-6 to implement the apparatus of FIG. 2. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system. In some examples, distance-based feature suppressor 109 can be used as part of automobile advanced driver-assistance systems (ADAS). Moreover, processor platform 700 may be included in such automobiles or in other moving vehicles. The input devices 722 may include one or more cameras mounted to an automobile or other moving vehicle at various locations, and these cameras may supply input images accessed by distance-based feature suppressor 109.

One or more output devices 724 are also connected to the interface circuit 720 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 3-6 may be stored in the mass storage device 728, in the volatile memory 714, in the non-volatile memory 716, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a feature comparer to:
      receive a feature list that records features of an image, wherein each feature has a respective measure of a property;
      compare the measure of the property of a first feature recorded in the feature list with measures of the property of a subset of the features that are located within a first distance of the first feature within the image; and
   a feature marker to mark a second feature located within the first distance of the first feature as valid and mark a remainder of the subset of the features as suppressed in response to the measure of the property of the second feature being greater than each of the measures of the property of the remainder of the subset of the features.

2. The apparatus of claim 1, further comprising a marking completion determiner to determine whether each feature in the feature list is marked as valid or suppressed.

3. The apparatus of claim 1, wherein the feature list is not sorted based on the measures of the property.

4. The apparatus of claim 1, wherein the feature comparer is to iterate backwards through the feature list.

5. The apparatus of claim 1, wherein the feature comparer is to iterate forward through the feature list.

6. The apparatus of claim 1, wherein the feature comparator is to compare the measure of the property of the first feature with the measures of the property of the subset of the features that are located within the first distance of the first feature based on the first feature being neither marked valid nor marked suppressed.

7. The apparatus of claim 1, wherein the feature comparer is to compare the measure of the property of the first feature with the measure of the property of a third feature of the subset of the features based on the third feature not being marked suppressed.

8. The apparatus of claim 1, wherein the features are recorded in the feature list in a raster scan order.

9. A system comprising:
   a feature list access circuit to access a feature list that lists features of an image, wherein each of the features has a respective measure of a property;
   a feature compare circuit to compare, for each feature in the feature list, the measure of the property of the respective feature with measures of the property of a subset of the features that are located within a first distance of the respective feature;
   a feature mark circuit to mark a first feature as valid and mark a remainder of the subset of the features that are located within the first distance of the first feature as suppressed; and
   a marking completion circuit to determine when each feature in the feature list is marked as valid or suppressed.

10. The system of claim 9, wherein the feature list is not sorted based on the measure of the property.

11. The system of claim 9, wherein the feature compare circuit is to iterate backwards through the feature list.

12. The system of claim 9, wherein the feature compare circuit is to iterate forward through the feature list.

13. The system of claim 9, wherein the feature mark circuit is configured to mark the first feature as valid and mark the remainder of the subset of the features that are located within the first distance of the first feature as suppressed based on the measure of the property of the first feature being greater than the measures of the property of the remainder of the subset of the features.

14. The system of claim 9, wherein the feature compare circuit is to compare the measure of the property of the respective feature with the measure of the property of the subset of the features that are located within the first distance of the respective feature based on the respective feature being neither marked valid nor marked suppressed.

15. A method comprising:
   accessing a feature list of features of an image;
   comparing a first feature in the feature list with a subset of the features that are located within a first distance of the first feature within the image; and
   when a measure of a property of a second feature located within the first distance of the first feature is greater than each measure of the property of a remainder of the subset of the features within the first distance of the first feature, marking the second feature as valid and marking the remainder of the subset of the features as suppressed.

16. The method of claim 15, wherein the feature list is not sorted based on the property.

17. The method of claim 15, wherein the comparing is repeated backwards through the feature list.

18. The method of claim 15, wherein the comparing is repeated forward through the feature list.

19. The method of claim 15, further comprising determining whether the first feature is marked valid or marked suppressed, wherein the comparing is performed based on the first feature being neither marked valid nor marked suppressed.

20. The method of claim 15 further comprising determining whether a third feature of the subset of the features is marked suppressed, wherein the marking of the second feature includes determining whether the measure of the property of the second feature is greater than the measure of the property of the third feature based on the third feature not being marked suppressed.

* * * * *